US006126158A

United States Patent [19]

Engibarov

[11] Patent Number: 6,126,158

[45] Date of Patent: Oct. 3, 2000

[54] SOFT JAW FOR A MACHINE VISE

[76] Inventor: Eddy Engibarov, 616 Onderdonk Ave., Ridgewood, N.Y. 11385

[21] Appl. No.: 09/198,198

[22] Filed: Nov. 23, 1998

[51] Int. Cl.[7] .......... B23Q 3/02

[52] U.S. Cl. .......... 269/136; 269/101; 269/138; 269/217; 269/157

[58] Field of Search .......... 269/136, 157, 269/101, 137, 138, 217

[56] References Cited

U.S. PATENT DOCUMENTS

| | | | |
|---|---|---|---|
| 2,625,861 | 1/1953 | Swanson | 269/43 |
| 4,802,661 | 2/1989 | Jewett, Sr. | 269/217 |
| 5,056,766 | 10/1991 | Engivarov | 269/136 |
| 5,060,920 | 10/1991 | Engibarov . | |
| 5,139,246 | 8/1992 | Yakou | 269/242 |
| 5,330,167 | 7/1994 | Plumb | 269/43 |
| 5,906,365 | 5/1999 | Wu | 269/43 |
| 5,984,291 | 11/1999 | Iwata et al. | 269/900 |

*Primary Examiner*—David A. Scherbel
*Assistant Examiner*—Lee Wilson
*Attorney, Agent, or Firm*—Helfgott & Karas, PC.

[57] ABSTRACT

A jaw assembly for use on a slideway of a machine table includes one or more guide rods over which a vise jaw freely slides. No fasteners or mounting members are required to mount and demount the jaw from the assembly. Before the jaw is tightened to apply a clamping force, it is held in an unbiased condition without the need for biasing springs.

19 Claims, 4 Drawing Sheets

SOFT JAW FOR A MACHINE VISE

BACKGROUND OF THE INVENTION

1. Field of the Invention

The present invention relates in general to vises, and particularly to a wedge-driven sliding jaw for use in precision machinery.

2. Description of Prior Developments

Workpieces are typically held in place on a machining table with a vise having a fixed or "hard" jaw and a movable or "soft" jaw. Examples of such vises are disclosed in U.S. Pat. Nos. 5,056,766 and 5,060,920 each of which is incorporated herein by reference. Although these vises function well, their structure and assembly can be somewhat involved.

Accordingly, what is needed is a precision vise having a relatively simplified construction, yet which provides accurate placement and retention of a workpiece on a machine table during machining operations such as milling, grinding, drilling, etc.

A further need exists for such a vise which facilitates rapid removal and replacement of soft jaw on a jaw holder.

Another need exists for such a soft jaw which is freely removable from a jaw holder and which does not require a spring biasing force for maintaining gripping accuracy.

SUMMARY OF THE INVENTION

The present invention has been developed to meet the needs noted above and therefore has an object the provision of a soft jaw assembly for a vise having a relatively simple construction and assembly.

Another object of the invention is the provision of a soft jaw assembly which mounts a soft jaw to a jaw holder with a simple manually mounted free-sliding fit.

Still another object of the invention is the provision of a soft jaw assembly which eliminates the need for biasing springs for resiliently holding a soft jaw in place on a jaw holder.

Yet another object of the invention is the provision of a soft jaw which mounts directly to a jaw holder without any intermediary connecting members and without the need for complex interconnections.

These and other objects are met in accordance with the present invention which is directed to a soft jaw assembly for a vise adapted for use with a machine table. The term soft jaw refers in general to a movable jaw which is formed from a material which is typically easily machined. The soft jaw assembly includes one or more guide rods and one or more co-acting guide channels or bores which allow a soft jaw to freely slide linearly (horizontally) toward and away from a jaw holder. The soft jaw assembly can be designed so that no tools are required to remove the soft jaw from the jaw holder. Moreover, no spring is required to bias the soft jaw toward the jaw holder so as to resiliently secure the jaw to the jaw holder.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
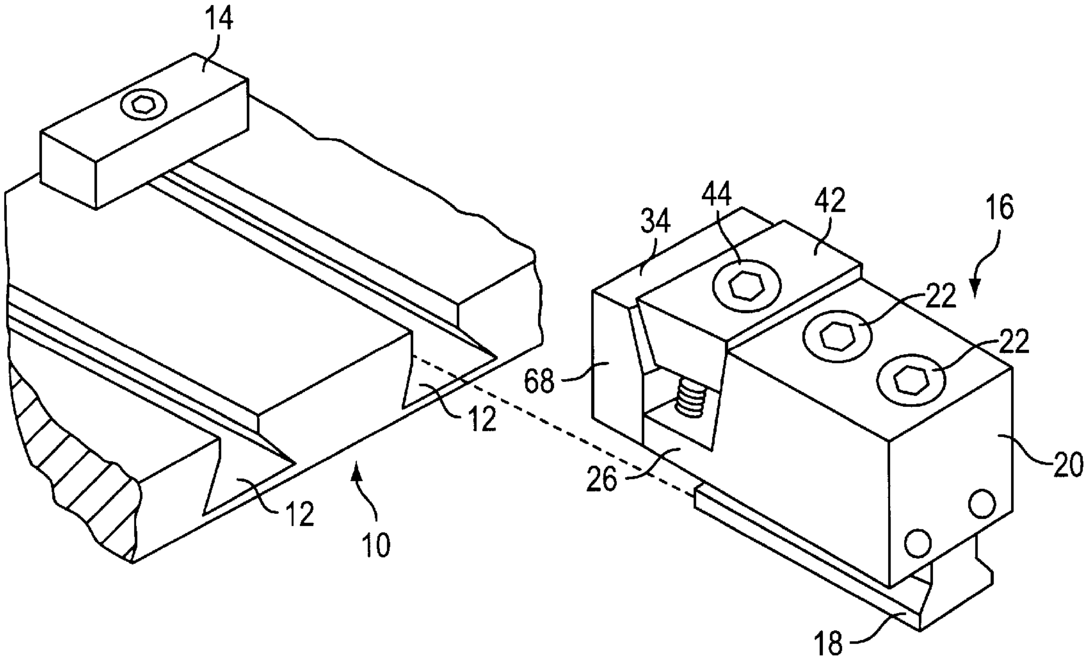
FIG. 1 is a perspective view of a portion of a machine table, partially in section, and a soft jaw assembly constructed in accordance with the invention.

The present invention will now be described in conjunction with the drawings, beginning with FIG. 1 which shows a conventional machine table 10 having one or more dovetailed slideways 12 formed therein. A hard jaw 14 is rigidly fixed to the machine table 10 in a known manner for forming a vise in combination with a soft jaw assembly 16 which slides into one of the slideways 12.

The soft jaw assembly 16 includes a slideway connector in the form of an adjustable dovetail 18 which is mounted on the bottom of a jaw holder 20 with a pair of threaded fasteners 22. As the fasteners 22 are tightened, the dovetail 18, which is spaced apart from the bottom of the jaw holder, is pulled toward the jaw holder 20 and as the fasteners are loosened, the dovetail separates from the jaw holder.

The dovetail 18 is adapted to slide freely within the dovetail slideway 12 so as to guide the soft jaw assembly 16 toward and away from the fixed hard jaw 14. In this manner, a workpiece may be clamped to the surface of the machine table 10 between the hard jaw 14 and the soft jaw assembly 16, as described further below.

Figure 2:
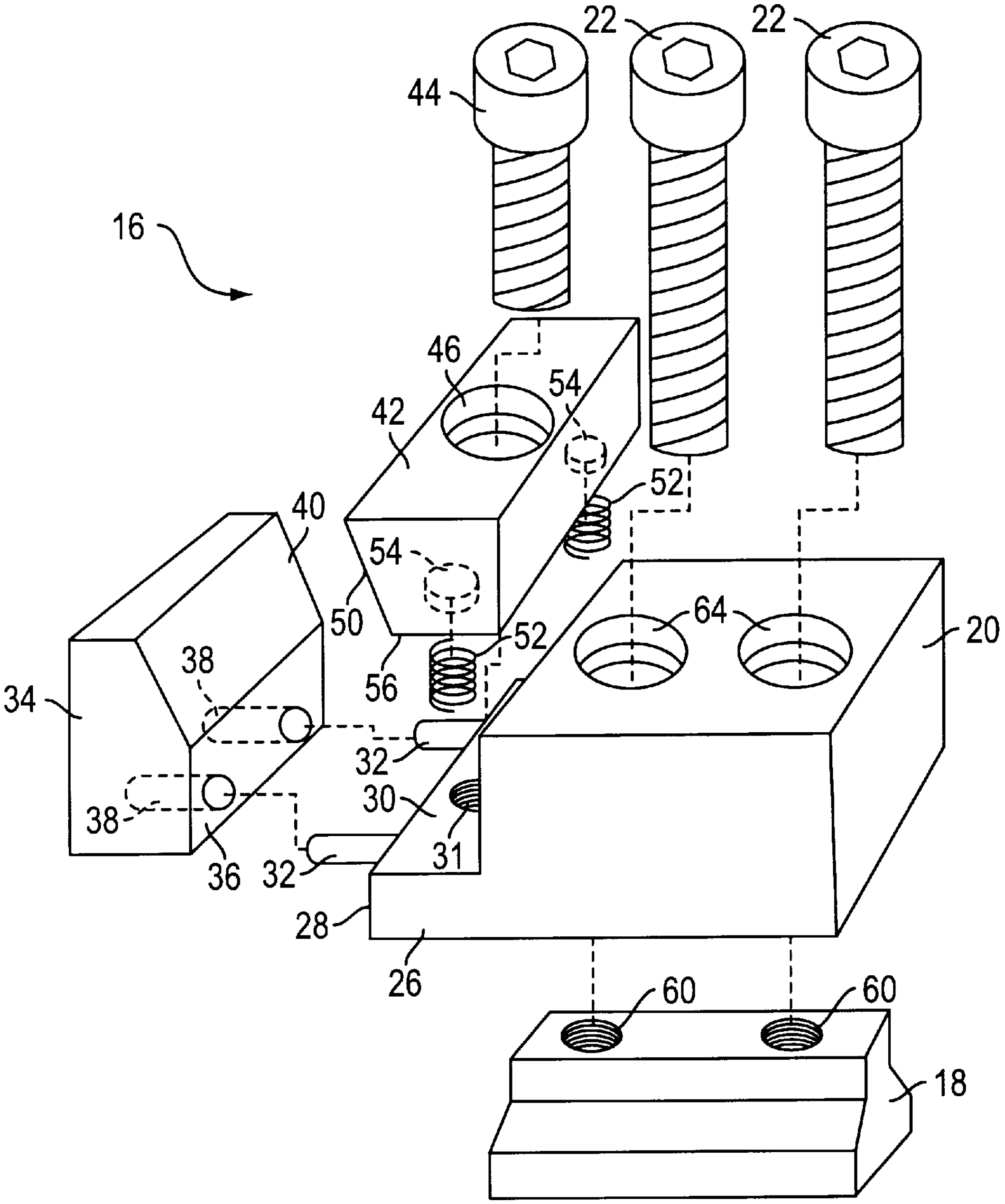
FIG. 2 is an exploded perspective view of the soft jaw of FIG. 1.

As seen in FIG. 2, the jaw holder 20 includes a front stepped portion 26 having a front wall 28 leading upwardly to a flat rectangular horizontal ledge 30. A threaded bore 31 is formed through the center of the ledge 30. A jaw guide is provided on the soft jaw assembly 16 in the form of a pair of cylindrical guide rods or guide tubes 32. The rods or tubes are mounted symmetrically on the front wall 28 and may be press fit within cylindrical bores formed within the stepped portion 26 or may be machined from the same material as that of the jaw holder 20.

Each guide rod or tube 32 is aligned perpendicular to the vertical front wall 28 and aligned parallel with one another. In this manner, the pair of guide rods or tubes provides a free sliding connection to a soft jaw 34. The soft jaw 34 has a vertical front face 36 within which a pair of cylindrical bores 28 is formed to closely and accurately receive the pair of guide rods or tubes with a close accurate sliding fit. A beveled or inclined wedge face 40 extends upwardly and forwardly away from the front face 36 to provide a wedge face to drive the soft jaw toward the hard jaw 14 as described below.

In order to drive the soft jaw 34 along the guide rods or tubes 32 toward the hard jaw 14, a drive member such as drive block 42 is movably and adjustably mounted on the jaw holder 20 above ledge 30. Drive block 42 is mounted on the stepped portion 26 with a threaded fastener 44 which slides freely into a smooth-walled stepped bore 46 formed through the central portion of the drive block. Fastener 44 engages the threaded bore 31 formed through the stepped portion 26. As fastener 44 is tightened and loosened, the drive block 42 respectively moves vertical downwardly and upwardly.

Drive block 42 further includes a drive face 50 which is beveled or inclined at the same angle as wedge face 40 on the soft jaw 34. Drive face 50 inclines upwardly and away from the jawholder 20 to engage wedge face 40 with a planar sliding wedging action. A pair of compression springs 52 is held within a pair of cylindrical recesses 54 formed in the bottom face 56 of the drive block 42. Springs 52 help to center the drive block on the jaw holder in a known fashion such as described in U.S. Pat. No. 5,056,776 noted above.

Figure 3:
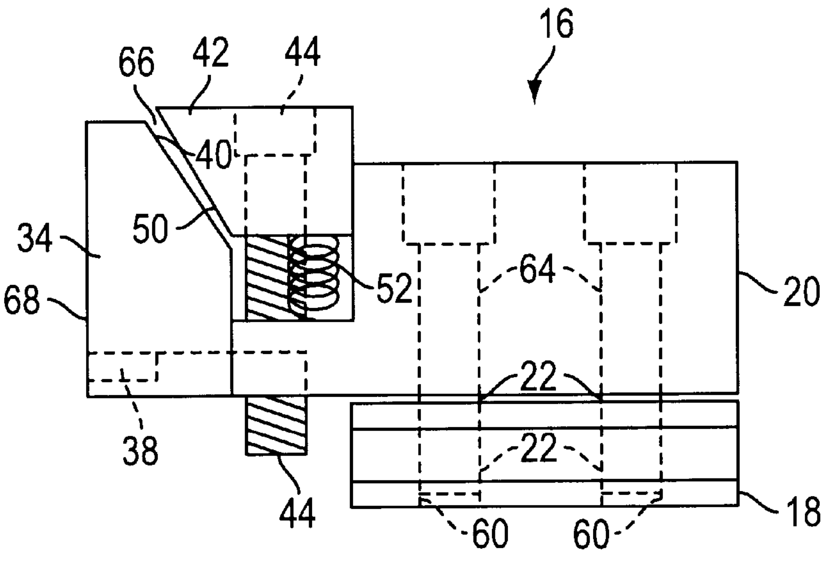
FIG. 3 is a side elevation view of the soft jaw of FIG. 1.

In order to clamp a workpiece on table 10 between the hard jaw 14 and the soft jaw 34, the soft jaw assembly 16 is assembled in a somewhat loose configuration as shown in FIG. 3. In this condition, the dovetail 18 is held loosely below the jaw holder 20 as threaded fasteners 22 loosely engage the threaded bores 60 in dovetail 18. Fasteners 22 pass freely through the smooth walled stepped bores 64 formed through the jaw holder 20.

The soft jaw 34 is manually mounted on the jaw guide by inserting rods or tubes 32 into bores 38. No permanent or supplemental fasteners are required to hold the soft jaw on the jaw holder. Threaded fastener 44 is threaded in bore 31 to hold the drive block 42 loosely above the stepped portion 26. A small gap 66 may be maintained between faces 40 and 50 as seen in FIG. 2.

In this condition, the soft jaw assembly is mounted to table 10 by sliding dovetail 18 into slideway 12 (FIG. 1) until the front face 68 of the soft jaw 34 pushes a workpiece against the hard jaw 14 in the manner of a vise. At this point, the fasteners 22 are tightened to lock the jaw holder 20 in place over the slideway 12. Fastener 44 is then tightened to drive the drive block 42 downward causing the drive face 50 to wedge against the wedge face 40 on the soft jaw 34. This wedging action causes the soft jaw 34 to slide horizontally away from the jaw holder 20 over the guide rods or tubes 32 and thereby tightly clamp a workpiece in position .

Figure 4:
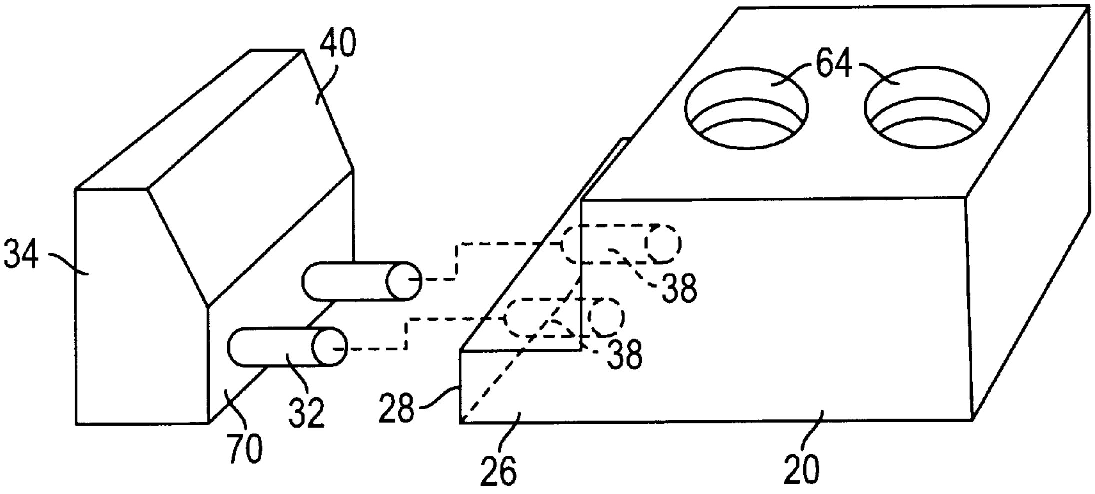
FIG. 4 is a view similar to FIG. 2 showing an alternate connection between the soft jaw and jaw holder.

As seen in FIG. 4, it is possible to mount the guide rods or tubes 32 on the rear or inner face 70 of the soft jaw 34 and to form the cylindrical recesses 38 in the front wall 28 of the stepped portion 26. In either the embodiment of FIGS. 1–3 or FIG. 4, an operator can manually mount the soft jaw 34 directly to the jaw holder 40 without tools and without any intermediate mounting member. A workpiece is easily removed from between the vise jaws by loosening fastener 44 which allows the soft jaw to release the workpiece. If desired, additional release and clearance can be effected by loosening fasteners 22 and sliding the soft jaw assembly along slideway 12 away from the hard jaw 14. A new workpiece can then be placed on table 10 in front of the hard jaw 14 for clamping by the soft jaw assembly 16. Alternatively, the soft jaw assembly can be removed from the slideway and a different soft jaw 34 can be mounted on the soft jaw assembly for clamping a different workpiece.

Figure 5:
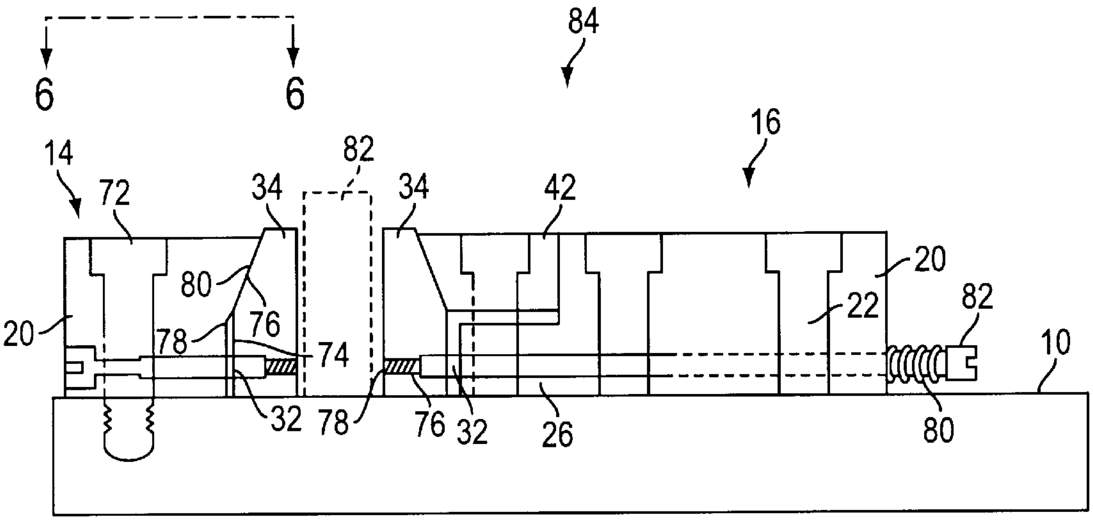
FIG. 5 is a side elevation view of a vise fitted with a pair of jaws in accordance with another embodiment of the invention.
Figure 6:
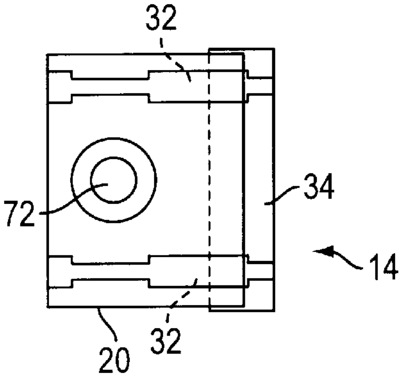
FIG. 6 is a top plan view of the fixed or hard jaw of FIG. 5 taken from lines 6—6 of FIG. 5.

Another embodiment of the invention is shown in FIGS. 5 and 6 wherein the hard jaw 14 of FIG. 1 is replaced with a fixed jaw holder 20 and a freely slidable soft jaw 34 which functions substantially the same as jaw 34 noted above. However, in this embodiment, the fixed jaw holder 20 is held in position on the machine table 10 with a fastener 72 which may be threaded into a bore formed in the machine table 10.

Alternatively, both the fixed hard jaw 20 and the soft jaw assembly 16 may be mounted on a single dovetail connector 18 and slid into a slideway 12 as a unit. In this case, the entire clamping movement is provided by wedging actuation of the soft jaw 34 with drive member 42.

The hard jaw 14 of FIGS. 5 and 6 does not require a drive member 42 since it need not be adjustable. The front face of the fixed jaw holder 20 includes a vertical bottom portion 74 and an upper inclined portion 76 which extends toward the soft jaw assembly 16. Complementary support surfaces 78, 80 are formed on the inner face of the soft jaw 34 mounted on the fixed jaw holder. The complementary wedge faces 76, 80 slide against one another to provide a self centering adjusting action as a workpiece 82 is clamped within vise assembly 84 between the pair of soft jaws 34.

In this embodiment the soft jaw 34 on the fixed jaw holder 20 can be quickly and easily removed without the use of tools since the soft jaw can be simply slid onto the guide rod or tubes 32 projecting from the vertical bottom portion 74 of the fixed jaw holder 20. In all embodiments, a free sliding linear interconnection between the soft jaw 34 and the jaw holder 20 is the sole interconnection between these members. No biasing spring is needed to bias the jaw toward the jaw holder and no additional hardware or fasteners are required to hold the jaw on the jaw holder.

Nevertheless, as an option, as shown in FIGS. 5 and 6, the pair of parallel guide rods or tubes 32 may be slidably mounted through the jaw holder 20 and may include threaded end portions 76 which are threaded into a pair of bores 78 formed in the soft jaw 34. This helps to hold the soft jaw in position on the jaw holder. In addition, a compression spring 80 can optionally be mounted between the jaw holder 20 and the screw head 82 formed on the rear end of each rod or tube 32. Spring 80 provides a biasing force to hold the soft jaw 34 against the jaw holder 20 and against the jaw driver drive block 42. A similar arrangement may be provided on the hard jaw assembly 14.

There has been disclosed heretofore the best embodiment of the invention presently contemplated. However, it is to be understood that various changes and modifications may be made thereto without departing from the spirit of the invention.

What is claimed is:

1. A jaw assembly adapted for use on a slideway of a machine table, comprising:

a jaw holder;

a connector provided on said jaw holder for mounting said jaw assembly in said slideway;

a first jaw guide provided on said jaw holder;

a jaw drive provided on said jaw holder;

a jaw operatively associated with said jaw holder;

a second jaw guide provided on said jaw; and a free sliding non-biased interconnection formed between said first and second jaw guides.

2. The assembly of claim 1 wherein said connector comprises a dovetail connector.

3. The assembly of claim 1, wherein said first jaw guide comprises a pair of rods extending from said jaw holder.

4. The assembly of claim 1, wherein said second jaw guide comprises a pair of bore holes formed within said jaw.

5. The assembly of claim 1, wherein said jaw holder comprises a ledge and wherein said jaw drive is mounted over said ledge.

6. The assembly of claim 5, wherein said jaw drive comprises an inclined drive face.

7. The assembly of claim 6, wherein said jaw comprises a wedge face slidably engageable with said inclined drive face.

8. The assembly of claim 1, wherein said jaw is mounted to said jaw holder solely by said first and second jaw guides.

9. The assembly of claim 1, wherein said jaw is freely slidable toward and away from said jaw holder.

10. A jaw assembly for a vise comprising:

a jaw holder having a front wall;

a pair of parallel guide rods projecting outwardly from said front wall;

a soft jaw slidably mounted on said guide rods; and a drive block mounted on said jaw holder for driving said soft jaw away from said jaw holder;

wherein a non-biased interconnection is formed between said jaw holder and said soft jaw.

11. The assembly of claim 10, wherein said soft jaw has a pair of bore holes formed therein and wherein said guide rods closely fit within said bore holes.

12. The assembly of claim 10, wherein said soft jaw is freely mounted on said jaw holder solely by said guide rods.

13. The assembly of claim 10, further comprising a connector mounted on said jaw holder for mounting said assembly on a machine table.

14. A method of clamping a workpiece on a machine table between a hard jaw and a soft jaw assembly, wherein said soft jaw assembly comprises a soft jaw having a pair of guide bores formed therein and a jaw holder having a pair of guide rods, and a non-biased interconnection is formed between said hard jaw and said soft jaw assembly, wherein said method comprises:

inserting said guide rods into said guide bores to slidably mount said soft jaw on said jaw holder and thereby assemble said soft jaw assembly;

mounting said soft jaw assembly on said machining table;

sliding said soft jaw assembly toward said hard jaw until said workpiece is held therebetween;

locking said soft jaw assembly on said machining table; and driving said soft jaw against said workpiece.

15. The method claim 14, wherein said soft jaw assembly comprises a connector, wherein said machine table comprises a slideway, and wherein said sliding further comprises sliding said connector along said slideway.

16. The method of claim 15, wherein said locking further comprises locking said connector in said slideway.

17. The method of claim 14, wherein said soft jaw assembly further comprises a drive member mounted on said jaw holder and wherein said driving further comprises driving said soft jaw with said drive member.

18. A jaw assembly for a vise, comprising:

a jaw holder;

a jaw carried by said jaw holder; and a free sliding, non-biased interconnection provided between said jaw and said jaw holder for linearly sliding said jaw toward said jaw holder and said jaw.

19. The assembly of claim 18, wherein said interconnection comprises a pair of guide rods extending between said jaw and said jaw holder.

* * * * *